United States Patent
Saeger et al.

(10) Patent No.: US 10,235,817 B2
(45) Date of Patent: Mar. 19, 2019

(54) MOTION COMPENSATION FOR ON-BOARD VEHICLE SENSORS

(71) Applicant: Ford Global Technologies, LLC, Dearborn, MI (US)

(72) Inventors: Martin Saeger, Pulheim (DE); Ashley Elizabeth Micks, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 99 days.

(21) Appl. No.: 14/842,621

(22) Filed: Sep. 1, 2015

(65) Prior Publication Data

US 2017/0061710 A1    Mar. 2, 2017

(51) Int. Cl.
  *G07C 5/02*    (2006.01)
  *B60W 40/06*   (2012.01)
  *G01C 7/04*    (2006.01)

(52) U.S. Cl.
  CPC .............. *G07C 5/02* (2013.01); *B60W 40/06* (2013.01); *G01C 7/04* (2013.01)

(58) Field of Classification Search
  None
  See application file for complete search history.

(56) References Cited

U.S. PATENT DOCUMENTS 6,161,071 A  * 12/2000  Shuman ................ B60K 28/06
                                              701/36
6,202,027 B1 *  3/2001  Alland ................. G01S 7/4004
                                              701/96

(Continued)

FOREIGN PATENT DOCUMENTS

DE     102010013178 A1 * 12/2010    ............ B60W 10/04
DE     102012017118 A1 *  5/2014    ............ B60W 10/22
                              (Continued)

OTHER PUBLICATIONS

Zimmer, Machine translation of DE 102010013178 A1, Dec. 2010, ip.com.*

(Continued)

*Primary Examiner* — David P. Merlino
(74) *Attorney, Agent, or Firm* — David R. Stevens; Stevens Law Group

(57) ABSTRACT

A method for improving the accuracy with which a road profile ahead of a vehicle may be determined. The method may include receiving a plurality of inputs corresponding to a plurality of on-board sensors corresponding to a vehicle. An on-board computer system may estimate motion of the vehicle. The on-board computer system may correct data corresponding to a forward-looking sensor of the plurality of on-board sensors by accounting for the motion of the vehicle. Accordingly, the on-board computer system may use the corrected data to produce more accurate information characterizing the driving environment ahead of the vehicle. This more accurate information may be used to better estimate the motion of the vehicle in the future as the vehicle encounters that driving environment, which may improve the corrections that may be applied to the data corresponding to the forward-looking sensor at that time.

17 Claims, 7 Drawing Sheets

(56) References Cited

U.S. PATENT DOCUMENTS

| | | | | |
|---|---|---|---|---|
| 6,219,600 | B1* | 4/2001 | Pochmuller | B60G 17/0162 |
| | | | | 701/37 |
| 6,233,510 | B1* | 5/2001 | Platner | B60G 13/16 |
| | | | | 701/37 |
| 6,763,292 | B1* | 7/2004 | Smith | B60G 17/015 |
| | | | | 701/1 |
| 6,898,501 | B2* | 5/2005 | Schubert | B60G 17/0165 |
| | | | | 701/36 |
| 7,692,552 | B2 | 4/2010 | Harrington | |
| 7,831,354 | B2* | 11/2010 | Bauer | B60T 8/172 |
| | | | | 700/29 |
| 7,957,562 | B2* | 6/2011 | Chang | G06K 9/00624 |
| | | | | 701/532 |
| 8,090,493 | B2 | 1/2012 | Aso | |
| 8,165,742 | B2* | 4/2012 | Wu | B60T 8/172 |
| | | | | 701/29.1 |
| 8,743,219 | B1* | 6/2014 | Bledsoe | G06T 5/006 |
| | | | | 348/208.4 |
| 9,423,498 | B1* | 8/2016 | Brown | G08G 1/16 |
| 9,533,539 | B2* | 1/2017 | Eng | B60G 17/019 |
| 9,794,483 | B1* | 10/2017 | Robinson | H04N 5/23267 |
| 2002/0121989 | A1* | 9/2002 | Burns | G08G 1/096827 |
| | | | | 340/901 |
| 2002/0147534 | A1* | 10/2002 | Delcheccolo | G01S 7/032 |
| | | | | 701/45 |
| 2003/0236604 | A1* | 12/2003 | Lu | B60G 17/0185 |
| | | | | 701/45 |
| 2004/0128066 | A1* | 7/2004 | Kudo | G01C 21/3617 |
| | | | | 701/468 |
| 2004/0158355 | A1* | 8/2004 | Holmqvist | G05D 1/0236 |
| | | | | 701/23 |
| 2005/0102072 | A1* | 5/2005 | Deakin | B63B 39/14 |
| | | | | 701/21 |
| 2005/0251325 | A1* | 11/2005 | Kudo | G01C 21/3484 |
| | | | | 235/472.01 |
| 2007/0055446 | A1* | 3/2007 | Schiffmann | G01S 7/4026 |
| | | | | 701/301 |
| 2010/0042292 | A1* | 2/2010 | Schindler | B60G 17/0165 |
| | | | | 701/37 |
| 2011/0040464 | A1* | 2/2011 | Ono | G01C 19/00 |
| | | | | 701/70 |
| 2012/0303176 | A1* | 11/2012 | Wong | G01S 17/023 |
| | | | | 701/1 |
| 2012/0330497 | A1* | 12/2012 | De Tommasi | G01C 21/165 |
| | | | | 701/33.1 |
| 2013/0046505 | A1* | 2/2013 | Brunner | G01C 21/165 |
| | | | | 702/141 |
| 2014/0028847 | A1* | 1/2014 | Wang | H04N 7/18 |
| | | | | 348/148 |
| 2014/0176726 | A1* | 6/2014 | Millward | H04N 5/23238 |
| | | | | 348/169 |
| 2014/0240500 | A1* | 8/2014 | Davies | H04N 7/183 |
| | | | | 348/148 |
| 2014/0297116 | A1 | 10/2014 | Anderson | |
| 2014/0330487 | A1* | 11/2014 | Brandt | B60R 1/0612 |
| | | | | 701/49 |
| 2014/0333473 | A1* | 11/2014 | Steinbuch | G01S 7/4004 |
| | | | | 342/174 |
| 2015/0314803 | A1* | 11/2015 | Kojo | B60W 30/18 |
| | | | | 701/43 |
| 2015/0365603 | A1* | 12/2015 | Wahl | G06K 9/00798 |
| | | | | 348/148 |
| 2015/0371095 | A1* | 12/2015 | Hartmann | G06K 9/00791 |
| | | | | 348/148 |
| 2016/0134799 | A1* | 5/2016 | Karam | H04N 5/23283 |
| | | | | 348/208.7 |
| 2016/0137209 | A1* | 5/2016 | Stainvas Olshansky | |
| | | | | G01C 25/00 |
| | | | | 701/301 |
| 2016/0223657 | A1* | 8/2016 | Huntzicker | G07C 5/0808 |

FOREIGN PATENT DOCUMENTS

| | | | | |
|---|---|---|---|---|
| DE | 102013223014 | A1 * | 5/2015 | B60W 40/064 |
| EP | 1745953 | A1 * | 1/2007 | B60G 17/018 |

OTHER PUBLICATIONS

Watermann, Machine translation of DE 102013223014 A1, May 2015, ip.com.*

Held, Machine translation of DE 102012017118 A1, May 2014, espacenet.com.*

Unterholzner, Vision-Based Online-Calibration of Inertial Gaze Stabilization, Jun. 2010, IEEE Intelligent Vehicles Synposium, p. 646-651, http://ieeexplore.ieee.org/abstract/document/5547982/.*

* cited by examiner

MOTION COMPENSATION FOR ON-BOARD VEHICLE SENSORS

BACKGROUND

Field of the Invention

This invention relates to vehicular systems and more particularly to systems and methods for improving the accuracy with which a road profile ahead of the vehicle may be determined.

Background of the Invention

To provide, enable, or support functionality such as driver assistance, controlling vehicle dynamics, and/or autonomous driving, an accurate and clear picture of the environment around (e.g., ahead of) a vehicle is vital. Unfortunately, the motion of the vehicle itself often makes it difficult to extract such a picture from the signal output by on-board sensors. Accordingly, what is needed is a system and method for improving the accuracy with which a road profile ahead of a vehicle may be determined.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
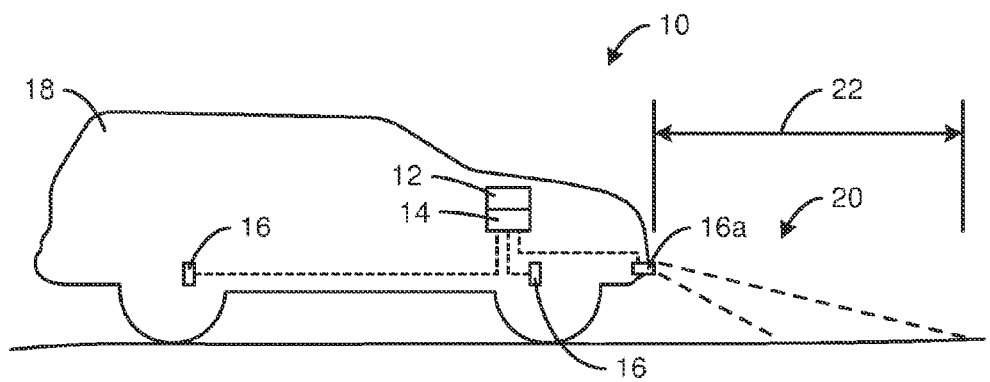
FIG. 1 is a schematic diagram illustrating a vehicle at a first instant in time, the vehicle comprising a system for correcting sensor inputs in accordance with the present invention.
Figure 2:
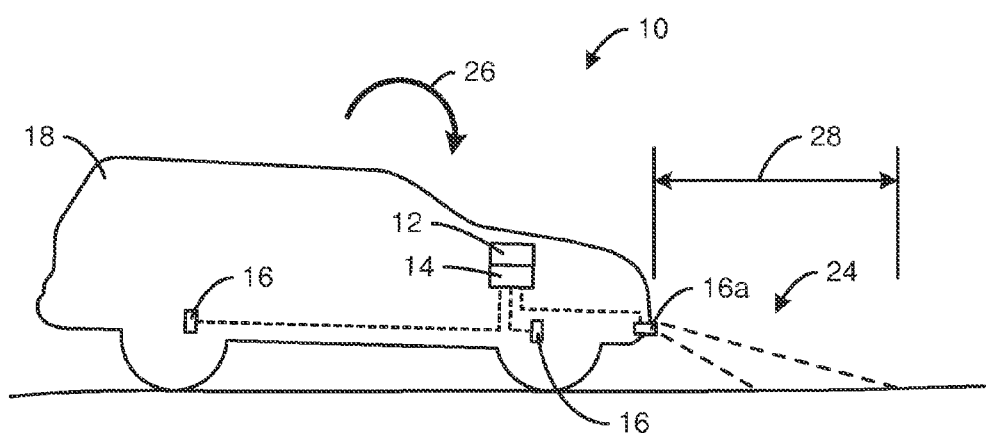
FIG. 2 is a schematic diagram illustration of the vehicle of FIG. 1 at a second instant in time in which the vehicle is pitched forward.

Referring to FIGS. 1 and 2, a system 10 in accordance with the present invention may improve the accuracy with which a driving environment may be characterized. A system 10 may do this in any suitable method. For example, a system 10 may be embodied as hardware, software, or some combination thereof.

In certain embodiments, a system 10 may include a computer system 12, a data acquisition system 14, and one or more sensors 16. The computer system 12, data acquisition system 14, and sensors 16 may be carried on-board a vehicle 18. Accordingly, those components 12, 14, 16 may each be characterized as "on-board" components. In operation, one or more sensors 16 may output signals, a data acquisition system 14 may convert those signals into inputs processable by an on-board computer system 12, and the on-board computer system 12 may process data corresponding to one or more sensors 16 in order to improve the accuracy thereof.

In selected embodiments, various sensors 16 may each comprise a transducer that senses or detects some characteristic of an environment and provides a corresponding output (e.g., an electrical or optical signal) that defines that characteristic. For example, one or more sensors 16 of a system 10 may be accelerometers that output an electrical signal characteristic of the proper acceleration being experienced thereby. Such accelerometers may be used to determine the orientation, acceleration, velocity, and/or distance traveled by a vehicle 18. Other sensors 16 of a system 10 may include cameras, laser scanners, lidar scanners, ultrasonic transducers, radar devices, gyroscopes, inertial measurement units, revolution counters or sensors, strain gauges, temperature sensors, or the like or combinations or sub-combinations thereof.

On-board sensors 16 may monitor the environment of a corresponding vehicle 18. Certain sensors 16 such as cameras, laser scanners, ultrasonic devices, radars, or the like may be used for driver assistance, controlling vehicle dynamics, and/or autonomous driving. For example, the data from such sensors 16 may be used to identify objects (e.g., other vehicles, traffic signs etc.) or surface anomalies (e.g., bumps, potholes, truck ruts) and their position (e.g., angle, distance) relative to a corresponding vehicle 18.

If a vehicle 18 rides over a bumpy road, a forward-looking sensor 16 (e.g., a vehicle-mounted camera 16a, laser sensor 16a, or the like monitoring the road surface ahead of the vehicle 18) may register the same portion of road at different angles, depending on the current motion state of the vehicle 18. Thus, a road profile calculated from this noisy sensor information becomes less accurate. Accordingly, in certain embodiments, to improve the usability of information collected from such sensors 16, a system 10 in accordance with the present invention may compensate for motion of the vehicle 18.

For example, at a first instant 20 in time, a forward-looking sensor 16a may have a range extending a first distance 22. However, at a second instant 24 in time, a vehicle 18 may have pitched forward 26 due to a bump, braking, or the like. Accordingly, in the second instant 24, the forward-looking sensor 16a may have a range extending a second distance 28 that is significantly shorter than the first distance 22. Thus, between the first and second instants 22, 24, the "view" of the sensor 16a may have changed faster or differently than what would have occurred strictly based on the velocity of the vehicle. This may produce unwanted noise or instability in the output of that sensor 16a. Accordingly, a system 10 may work to filter out such noise.

Figure 3:
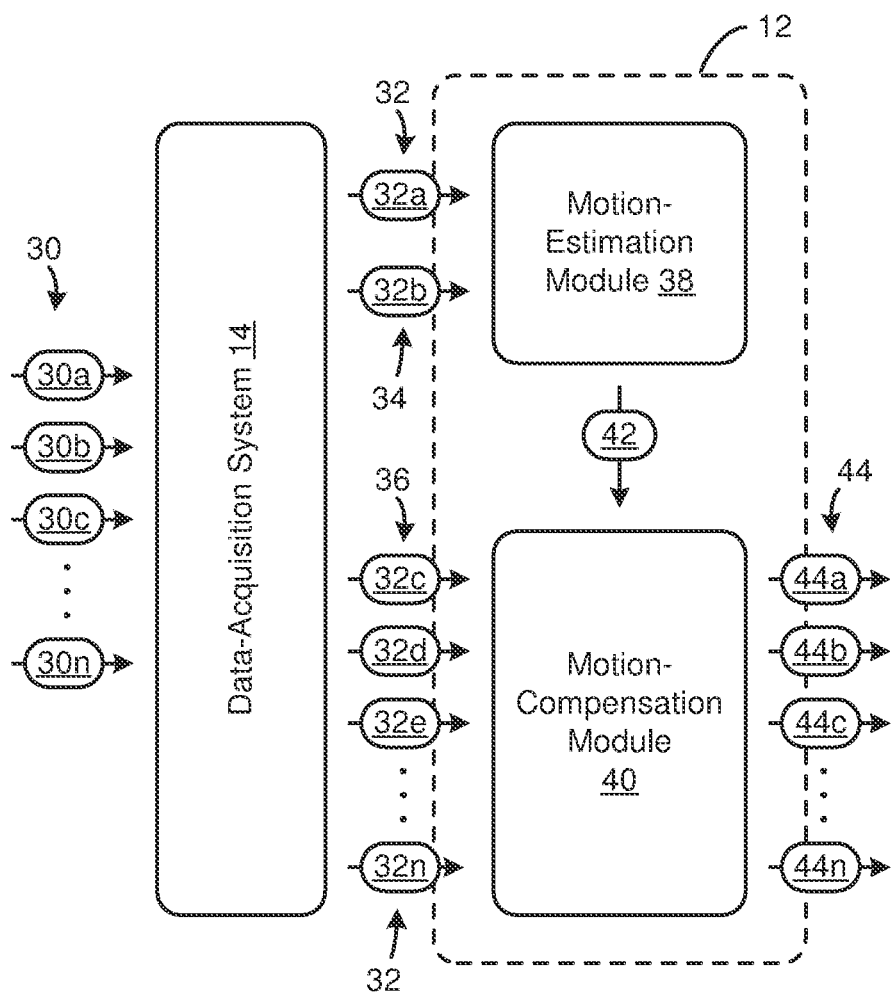
FIG. 3 is a schematic block diagram of one embodiment of software that may be executed by the system of FIG. 1.

Referring to FIG. 3, in selected embodiments, a data acquisition system 14 may sample signals 30 output by one or more sensors 16 and convert the resulting samples into inputs 32 (e.g., digital numeric values) that can be manipulated by an on-board computer system 12. For example, a data acquisition system 14 may convert signals 30 in the form of analog waveforms into inputs 32 in the form of digital values suitable for processing. In certain embodiments, a data acquisition system 14 may include conditioning circuitry that converts signals 30 output by one or more sensor 16 into forms that can be converted to digital values, as well as analog-to-digital converters to perform such converting.

In certain embodiments, inputs 32 produced by a data acquisition system 14 may be separated into two categories 34, 36. In a first category 34 may be those inputs 32 that are less adversely affected by motion of a corresponding vehicle 18. In a second category 36 may be those that are more adversely affected by motion of a corresponding vehicle 18.

In selected embodiments, inputs 32 in the first category 34 may include one or more driver inputs 32a and/or direct motion inputs 32b. Driver inputs 32a may include one or more values characterizing things such as velocity, drive torque, brake actuation, steering input, or the like or combinations or sub-combinations thereof. Direct motion inputs 32b may include one or more values obtained from one or more signals 30 corresponding to one or more inertial measurement units, gyroscopes, accelerometers, or the like or combinations or sub-combinations thereof.

Inputs 32 in the second category 36 may include one or more inputs 32 for which correction or compensation is needed or desired. Such inputs 32 may include one or more values corresponding to one or more forward-looking sensors 16. For example, inputs 32 in the second category 36 may corresponding to one or more cameras, laser sensors or scanners, lidar scanners, ultrasonic transducers, or the like or combinations or sub-combinations thereof.

An on-board computer system 12 in accordance with the present invention may provide, enable, or support an integrated compensation system utilizing various sensors 16 mounted on a corresponding vehicle 18. In selected embodiments, this may be accomplished at least in part by using inputs 32 in the first category 34 to correct or compensate for inputs 32 in the second category 36.

In selected embodiments, an on-board computer system 12 may be self contained and operate independent of any other computer system or hardware that is not carried on-board the corresponding vehicle 18. Alternatively, an on-board computer system 12 may communicate as necessary with at least one remote computer via a communication network (e.g., a cellular network, satellite network, local area wireless network, or the like).

An on-board computer system 12 may comprise computer hardware and computer software. The computer hardware of an on-board computer system 12 may include one or more processors, memory, a user interface, one or more antennas, other hardware, or the like or a combination or sub-combination thereof. The memory may be operably connected to the one or more processors and store the computer software. This may enable the one or more processors to execute the computer software.

A user interface of an on-board computer system 12 may enable an engineer, technician, or a driver to interact with, customize, or control various aspects of an on-board computer system 12. In selected embodiments, a user interface of an on-board computer system 12 may include one or more buttons, keys, touch screens, pointing devices, or the like or a combination or sub-combination thereof. In other embodiments, a user interface of an on-board computer system 12 may simply comprise one or more connection ports, pairings, or the like that enable an external computer to interact or communicate with the on-board computer system 12.

In certain embodiments, an on-board computer system 12 may include an antenna that enables the on-board computer system 12 to communicate with at least one remote computer via a communication network (e.g., a cellular network connected to the Internet), an antenna to receive GPS signals from one or more GPS satellites, or the like or a combination thereof.

In selected embodiments, the memory of an on-board computer system 12 may store software programmed to use inputs 32 in the first category 34 to correct or compensate for inputs 32 in the second category 36. Such software may have any suitable configuration. In certain embodiments, the software of an on-board computer system 12 may include a motion-estimation module 38 and a motion-compensation module 40.

A motion-estimation module 38 may use one or more inputs 32 to determine how a corresponding vehicle 18 is moving. In selected embodiments, this may be accomplished by combining inputs 32a characterizing driver controlled parameters such as velocity, drive torque, brake actuation, steering input, or the like with inputs 32b indicative of a current attitude or orientation of a body of the vehicle 18 to obtain motion information 42 articulating the current motion state of the body of the vehicle 18.

In selected embodiments, a motion-estimation module 38 may use inputs 32a characterizing driver controlled parameters to obtain or define a vector setting forth a direction of travel and velocity at a particular moment in time. Inputs 32b indicative of a current attitude or orientation of a body of the vehicle 18 may corresponding to one or more inertial measurement units, gyroscopes, accelerometers, or the like or combinations or sub-combinations thereof. A motion-estimation module 38 may use such inputs 32b to define one or more parameters such as pitch, roll, and yaw of a body of the vehicle 18. Accordingly, by using both inputs 32a, 32b, a motion-estimation module 38 may output motion information 42 that substantially completely estimates and articulates the motion of the body of vehicle 18 at a given moment in time.

The motion information 42 produced by a motion-estimation module 38 may be used by a motion-compensation module 40 to compensate for the motions which certain sensors 16 (e.g., sensors 16 corresponding to inputs 32 of the second category 36) experience relative to the surroundings they are intended to measure. This compensation may be the product of an algorithm applied by the motion-compensation module 40. Accordingly, a motion-compensation module 40 may output one or more corrected inputs 44 or compensated inputs 44 that are more useful (e.g., more stable, less noisy, etc.).

Figure 4:
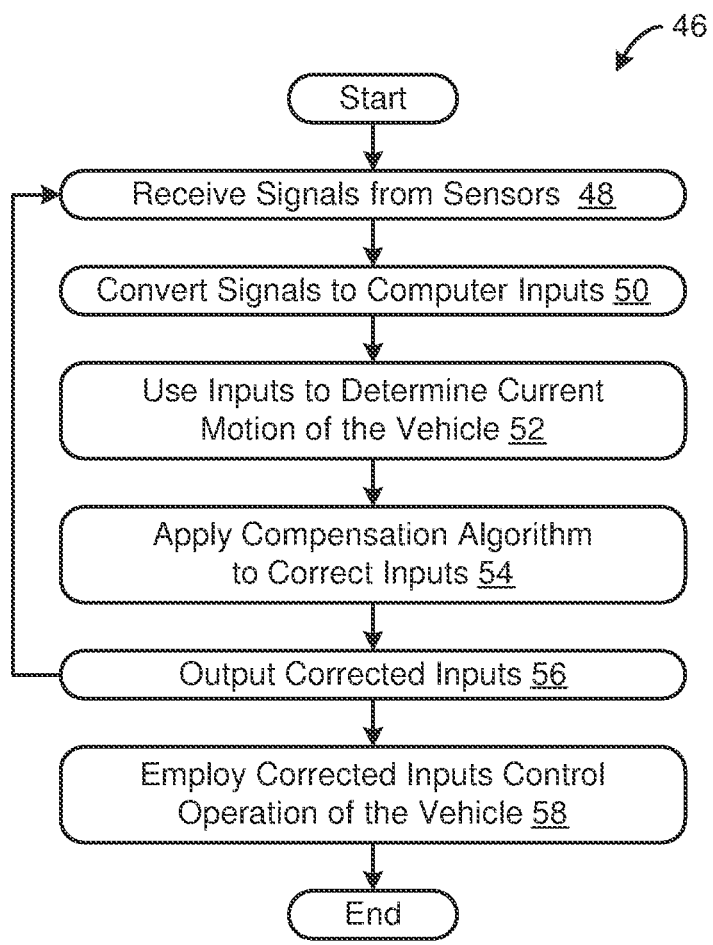
FIG. 4 is a schematic block diagram of one embodiment of a method corresponding to or executed by a system in accordance with the present invention.

Referring to FIG. 4, a system 10 may support, enable, or execute a process 46 in accordance with the present invention. In selected embodiments, such a process 46 may begin with receiving 48, by a data acquisition system 14, signals 30 from one or more sensors 16. The signals 30 may be converted 50 to computer inputs 32 by the data acquisition system 14.

An on-board computer system 12 (e.g., a motion-estimation module 38) may use 52 certain inputs 32 (e.g., inputs 32 in a first category 34) to determine the current motion of a corresponding vehicle 18. The on-board computer system 12 (e.g., a motion-compensation module 40) may further apply 54 a compensation algorithm to correct other inputs 32 (e.g., inputs 32 in a second category 36). In selected embodiments, the compensation algorithm may use information 42 defining the current motion of the corresponding vehicle 18 to reduce the adverse effects of that motion on certain inputs 32 (e.g., inputs 32 in a second category 36). Accordingly, an on-board computer system 12 (e.g., a motion-compensation module 40) may output 56 corrected inputs 44.

In general, there may be three coordinate systems to consider in devising a compensation algorithm. The first may be a global, inertial coordinate system. The second may be an undisturbed coordinate system of a vehicle 16. This may be the coordinate system of an "undisturbed" version of the vehicle 16, which may be defined as having its "xy" plane parallel to a ground plane (e.g., an estimated ground plane). The third may be a disturbed coordinate system of the vehicle 16. This may be the coordinate system of an actual vehicle performing roll, pitch, heave, and yaw motions which can be driver-induced (e.g., caused by steering, braking, accelerating, or the like) or road-induced (e.g., caused by road irregularities or the like) or due to other disturbances (e.g., side wind or the like).

In selected embodiments, a compensation algorithm may transform inputs 32 corresponding to signals 30 measured in the third coordinate system into the first coordinate system (e.g., for determining the positions of targets/objects relative to the vehicle 16) and/or the second coordinate system (e.g., for performing collision avoidance functionalities). Transforming the inputs 32 from one coordinate system to another may be performed using transformation matrices.

For example, any disturbance in the inputs 32 (which inputs 32 may be described as vectors) caused by motion of the vehicle body relative to the first coordinate system (e.g., heave, pitch, roll, yaw) may be seen as a transformation that could be described as a matrix operation. Accordingly, correcting the disturbance may involve un-doing the disturbance transformation by performing another matrix transformation. The coupled result of both transformation operations (e.g., disturbance transformation and correction transformation) may be neutral. Thus, in selected embodiments, a compensation algorithm may execute three steps, namely: (1) determine or estimate a disturbance transformation (e.g., disturbance matrix) based on a currently detected motion state; (2) determine a transformation operation (e.g., correction matrix) that would compensate for the estimated disturbance; and (3) perform the compensation transformation on a current, disturbed input 32 (e.g., input vector).

The steps 46, 50, 52, 54, 56 for obtaining corrected inputs 44 may be substantially continuously repeated. The time interval between each such repeat may be relatively small (e.g., a small fraction of a second). Accordingly, corrected inputs 44 that are up-to-date may be substantially continuously available. Thus, the corrected inputs 44 produced by a system 10 in accordance with the present invention may be suitable for use in processes where reaction time is important and must be fast.

Corrected inputs 44 may be employed 58 to control certain operations of a corresponding vehicle 18. For example, in selected embodiments, corrected inputs 44 may be used for driver assistance. This may include collision avoidance or the like. In other embodiments, corrected inputs 44 may be used for controlling vehicle dynamics. This may include modifying the dynamics of a vehicle 18 to better deal with an obstacle. For example, corrected inputs 44 may enable a vehicle 18 to lift a wheel to avoid a pothole or the like. In still other embodiments, corrected inputs 44 may be used for autonomous driving. This may include recognizing and properly negotiating road boundaries, lane markers, obstacles, other vehicles, and the like.

Figure 5:
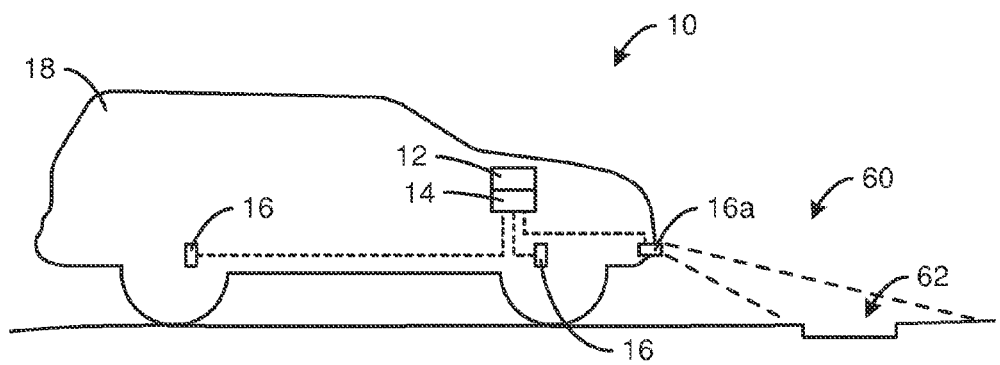
FIG. 5 is a schematic diagram illustration of the vehicle of FIG. 1 at a third instant in time in which one or more sensors of the system are "viewing" a pothole located ahead of the vehicle.
Figure 6:
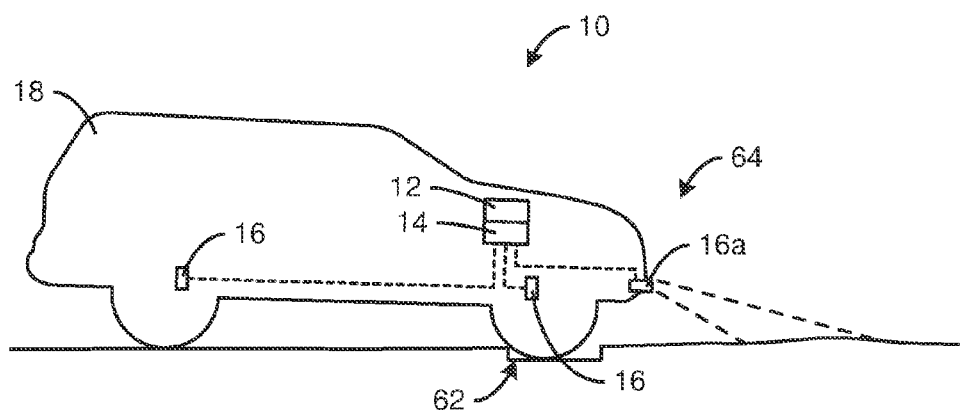
FIG. 6 is a schematic diagram illustration of the vehicle of FIG. 1 at a fourth instant in time in which the vehicle is encountering (e.g., driving over) the pothole.

Referring to FIGS. 5 and 6, in selected embodiments, corrected inputs 44 may provide a better view of certain physical features in the environment of the corresponding vehicle 18. Accordingly, a system 10 may use that better view to better estimate the motion of the vehicle 18, which better estimation may better correct one or more inputs 32. In certain embodiments, this may allow one or more forward-looking sensors 16a to contribute to and improve the accuracy of the motion information 42.

For example, one or more forward-looking sensors 16a (e.g., cameras) may detect a physical feature ahead of a corresponding vehicle 18. An on-board computer system 12 may use that physical feature in one or more ways to better estimate the current motion of the vehicle 18. In certain embodiments, the relative position of the physical feature may be tracked over some period of time. This may enable an on-board computer system 12 to better understand how a corresponding vehicle 18 is moving with respect to that physical feature. For example, if the physical feature is a horizon, tracking that horizon using one or more forward-looking sensors 16a may provide information on the pitch, the roll, and potentially the yaw of the vehicle 18.

Alternatively, or in addition thereto, a physical feature may be detected and analyzed to determine something about the motion of the vehicle at a future time (e.g., at the time the corresponding vehicle 18 encounters or drives over that physical feature). For example, at a first instant 60 in time, one or more forward-looking sensors 16a may detect a physical feature such as a pothole 62, bump, curving center line, or the like. After determining the nature of the physical feature, speed of the vehicle 18, direction of the vehicle 18, and the like, an on-board computer system 12 may predict how the physical feature will affect the motion of the vehicle 18 at a second instant 64 in time (i.e., the time the vehicle 18 encounters the physical feature). Accordingly, an on-board computer system 12 may use that prediction to obtain more accurate motion information 42 suitable for correcting inputs 32 corresponding to signals 30 collected at the time of the second instant 64.

Figure 7:
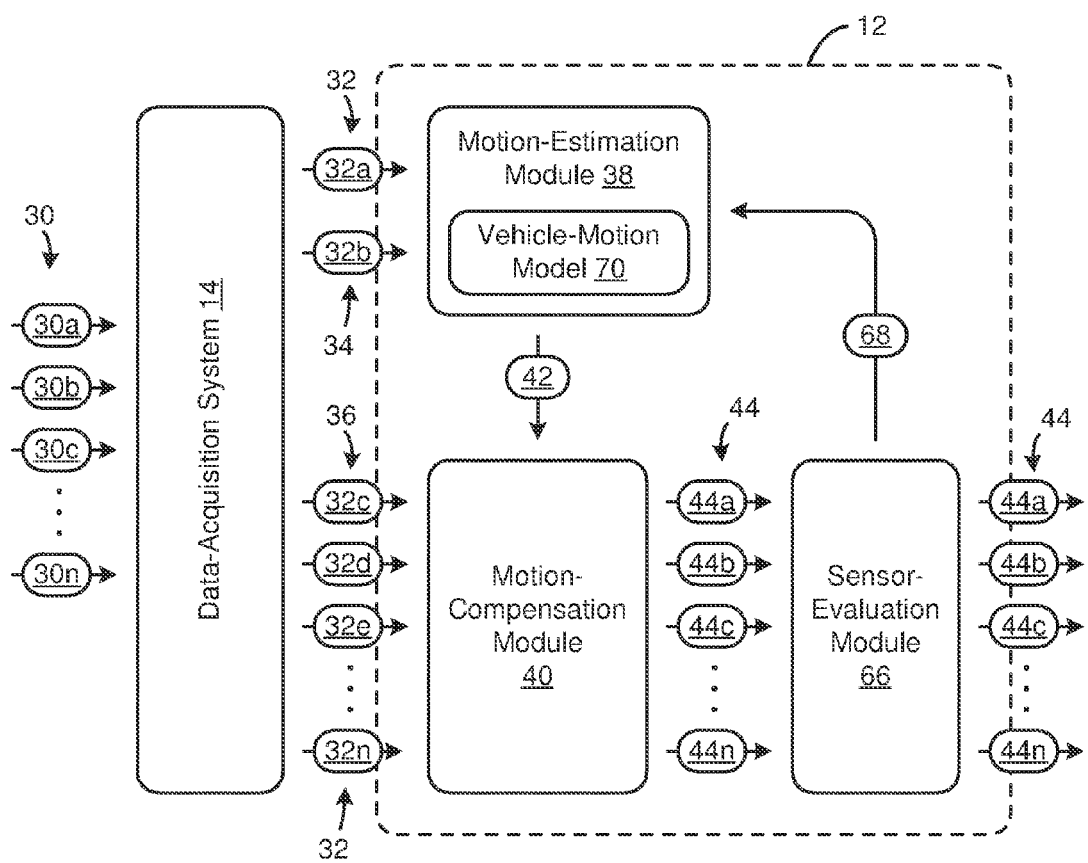
FIG. 7 is a schematic block diagram of an alternative embodiment of software that may be executed by the system of FIG. 1.

Referring to FIG. 7, in certain embodiments, the software of an on-board computer system 12 may include a motion-estimation module 38, a motion-compensation module 40, and a sensor-evaluation module 66. A sensor-evaluation module 66 may analyze one or more corrected inputs 44 to obtain therefrom data 68 that may be used by a motion-estimation module 38 to better estimate the motion of the corresponding vehicle 18. The data 68 may characterize current motion of a vehicle 18, future motion a physical feature or set of physical features is likely to produce when the physical feature or set is encountered, or a combination current motion and future motion.

In selected embodiments, a sensor-evaluation module 66 may provide, support, or enable an iterative process to produce corrected inputs 32. An iterative process may be particularly useful when the data 68 characterizes the current motion of a vehicle 18. The number of iterations may vary and may be selected to accommodate the processing capabilities and available time. In certain embodiments, to shorten response time, only one iteration may be executed for a given set or batch of inputs 32, which set or batch would correspond to a particular moment in time.

In embodiments where the data 68 characterizes (e.g., exclusively characterizes) future motion a physical feature or set of physical features is likely to produce when the physical feature or set is encountered, the data 68 may be taken into account without an iterative process. For example, the data 68 corresponding to a first instant 60 in time may be stored in memory of an on-board computer system 12. Accordingly, the data 68 may be available and ready to use in estimating the motion of the body of the vehicle 18 at the second instant 62 in time.

In selected embodiments, a motion-estimation module 38 may include a virtual, vehicle-motion model 70. In operation, a vehicle-motion model 70 may be provided with one or more driver inputs 32a and data 68 characterizing a road ahead of the vehicle 18. With this information 32, 68, the vehicle-motion model 70 may predict motion states of the body of the vehicle 18. Thereafter, as the road ahead becomes the road currently being encountered, inputs 32 (e.g., direct motion inputs 32b and/or inputs 32 from forward-looking sensors 16a) characterizing current motion states may be used to correct those earlier predictions. In certain embodiments, this correction of predictions and the resulting production of motion information 42 may be accomplished through the application of a Kalman filter.

The parameters of a virtual, vehicle-motion model 70 may be determined or specified in any suitable manner. In selected embodiments, certain parameters of a vehicle-motion model 70 may be derived from previous knowledge of the mechanical properties (e.g., geometries, inertia, stiffness, damping coefficients, etc.) of the vehicle 18. Alternatively or addition thereto, self-learning algorithms may be used. Such algorithms may adapt certain parameters of a virtual, vehicle-motion model 70 to reflect real-world conditions and/or changes due to loading, ageing, temperature effects, or the like or combinations or sub-combinations thereof. Accordingly, the parameters may be selected and/or optimized to closely match predicted and measured motion.

Figure 8:
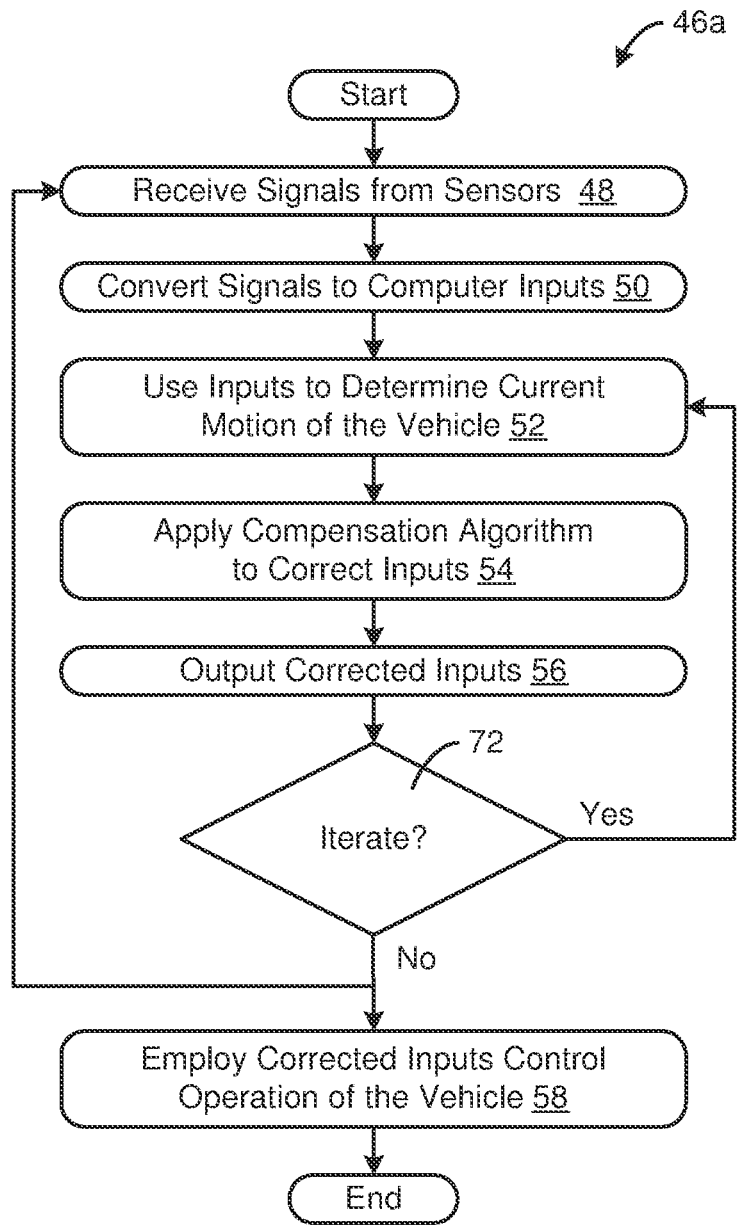
FIG. 8 is a schematic block diagram of an alternative embodiment of a method corresponding to or executed by a system in accordance with the present invention.

Referring to FIG. 8, a system 10 may support, enable, or execute an alternative process 46a in accordance with the present invention. In selected embodiments, such a process 46a may include a decision 72 to iterate after the corrected inputs 44 have been output 56.

If an iteration (or an additional iteration) is to be performed, the corrected inputs 44 or data (e.g., data 68) derived therefrom may be fed into a motion-estimation module 38 so that the accuracy motion information 42 at a particular moment in time may be improved. If no iteration (or no additional iteration) is to be performed, a system 10 may move on and process inputs 32 corresponding to a later moment in time. The corrected inputs 44 produced with each round may be employed 58 as desired or necessary.

Figure 9:
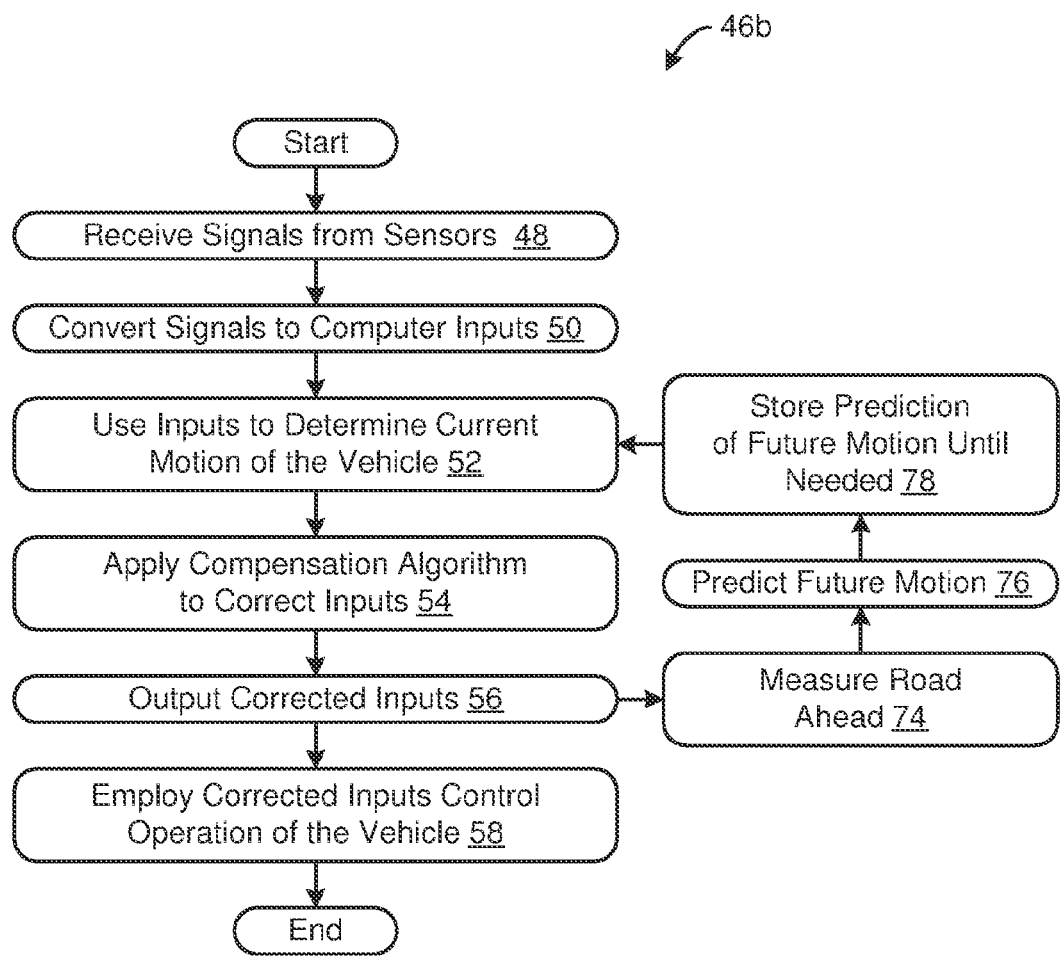
FIG. 9 is a schematic block diagram of another alternative embodiment of a method corresponding to or executed by a system in accordance with the present invention.

Referring to FIG. 9, a system 10 may support, enable, or execute another alternative process 46b in accordance with the present invention. In selected embodiments, such a process 46b may include using corrected inputs 44 to measure 74 or otherwise characterize a road ahead of the corresponding vehicle 18. This understanding of the road ahead may enable an on-board computer system 12 (e.g., a motion-estimation module 38) to predict 76 future motion of the vehicle 18 (e.g., motion of the vehicle 18 as it drives over that portion of road). The prediction of future motion may be stored 78 as necessary until it is needed or used. In this manner, a system 10 in accordance with the present invention may provide rapid, real-time correction of inputs 32. Accordingly, the corrected inputs 44 produced thereby may be suitable for use in various driver assistance, vehicle dynamics, and/or autonomous driving activities where a short processing and reaction time is important or even vital.

The flowcharts in FIGS. 4, 8, and 9 illustrate the architecture, functionality, and operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
   carrying on-board, by a vehicle, a computer system and a plurality of sensors;
   receiving, by the computer system, first data characterizing one or more conditions sensed by the plurality of sensors at a particular moment in time;
   estimating, by the computer system based on the first data, an expected amount of movement of the vehicle at a future time after the particular moment in time with respect to a reference coordinate system at the particular moment in time based on a feature located in front of the vehicle and detected in the first data;
   defining a transformation according to the estimating of the expected amount of movement of the vehicle relative to the reference coordinate system; and
   receiving, by the computer system, second data characterizing one or more conditions sensed at the future time by one or more sensors of the plurality of sensors when the feature is located under the vehicle;
   correcting, by the computer system, the second data by transforming a plurality of coordinates in the second data from a sensor coordinate system to the reference coordinate system according to the transformation.

2. The method of claim 1, wherein at least one of the one or more sensors comprises a forward-looking sensor characterizing a driving environment ahead of the vehicle.

3. The method of claim 2, further comprising producing, by the computer system, information characterizing the driving environment ahead of the vehicle.

4. The method of claim 3, wherein each sensor of the one or more sensors is selected from the group consisting of an ultrasonic transducer, a laser scanner, and a lidar scanner.

5. The method of claim 1, wherein the estimating comprises correcting a predicted motion of the vehicle with the first data.

6. The method of claim 5, wherein the correcting the predicted motion comprises applying a Kalman filter.

7. The method of claim 6, wherein the first data characterize the attitude of a body of the vehicle in at least one of pitch, roll, and yaw.

8. The method of claim 6, further comprising producing, by the computer system, the predicted motion.

9. The method of claim 8, wherein at least one of the one or more sensors comprises a forward-looking sensor directed to an area in front of the vehicle.

10. The method of claim 9, wherein estimating the expected amount of movement of the vehicle at the future time comprises:
using, by the computer system, the first data to profile a portion of road ahead of the vehicle at the particular moment in time; and
using, by the computer system, a virtual, vehicle-motion model and the profile to generate the expected amount of movement.

11. A method comprising:
carrying, by a vehicle, an on-board computer system and a plurality of on-board sensors;
receiving, by the on-board computer system, a first plurality of inputs characterizing one or more first conditions sensed by the plurality of on-board sensors at a particular moment in time;
estimating, by the on-board computer system based on one or more inputs of the first plurality of inputs, expected movement of a body of the vehicle in terms of heave, pitch, yaw, and roll with respect to a reference coordinate system at a future time according to at least one feature detected in front of the vehicle in the one or more inputs of the first plurality of inputs;
defining, by the on-board computer system, a transformation matrix according to the estimating of the expected movement of the body of the vehicle in terms of heave, pitch, yaw, and roll with respect to the reference coordinate system; and
receiving, by the on-board computer system, a second plurality of inputs characterizing one or more second conditions sensed by a forward-looking sensor of the plurality of on-board sensors at a time when the at least one feature is under the vehicle;
correcting, by the on-board computer system, data characterizing the one or more second conditions by multiplying a plurality of coordinates in a portion of the second plurality of inputs received from the forward-looking sensor by the transformation matrix to obtain corrected coordinates.

12. The method of claim 11, wherein the forward-looking sensor is selected from the group consisting of an ultrasonic transducer, a laser scanner, and a lidar scanner.

13. A vehicle comprising:
a plurality of on-board sensors producing sensor coordinates in a sensor coordinate system;
an on-board computer system; and
an on-board data acquisition system converting signals from the plurality of on-board sensors to a plurality of inputs processable by the on-board computer system;
the on-board computer system comprising memory and at least one processor operably connected to the memory, the memory storing
a motion-estimation module programmed to estimate, based at least in part on one or more inputs of the plurality of inputs, expected movement of the vehicle at a future time with respect to a reference coordinate system in response to a feature sensed in front of the vehicle at a particular moment in time, the future time being a future time when the feature will be under the vehicle, and
a motion-compensation module programmed to:
generate a transformation matrix according to the estimating of the expected movement of the vehicle with respect to the reference coordinate system; and
correct data characterizing a condition sensed by one or more sensors of the plurality of on-board sensors after the particular moment in time when the feature is under the vehicle by multiplying the sensor coordinates in the data characterizing the condition by the transformation matrix to obtain corrected coordinates.

14. The vehicle of claim 13, wherein at least one of the one or more sensors comprises an on-board, forward-looking sensor characterizing a driving environment ahead of the vehicle.

15. The vehicle of claim 14, wherein the memory further stores a sensor-evaluation module programmed to output information characterizing the driving environment ahead of the vehicle.

16. The vehicle of claim 13, wherein the motion-estimation module is further programmed to apply a Kalman filter to estimate the expected movement of the vehicle at the future time when the feature is under the vehicle.

17. The vehicle of claim 16, wherein each sensor of the one or more sensors is selected from the group consisting of an ultrasonic transducer, a laser scanner, and a lidar scanner.

* * * * *